United States Patent
Baumgarten et al.

(10) Patent No.: US 7,152,620 B2
(45) Date of Patent: Dec. 26, 2006

(54) FLOW-REVERSING VALVE

(75) Inventors: Sven Baumgarten, Freinsheim (DE); Stephen Bross, Erpolzheim (DE); Bernhard Brecht, Neustadt/Weinstrasse (DE); Uwe Bruhns, Osthofen (DE); Mogens Ellegaard, Greve (DK); Stefan Flak, Frankenthal (DE); Christoph Jaeger, Gerolsheim (DE); Wolfgang Kochanowski, Windesheim (DE); Wiltrud Knoebl, Ludwigshafen (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 11/222,802

(22) Filed: Sep. 12, 2005

(65) Prior Publication Data

US 2006/0060245 A1 Mar. 23, 2006

Related U.S. Application Data

(63) Continuation of application No. PCT/EP04/00987, filed on Feb. 4, 2004.

(30) Foreign Application Priority Data

Mar. 12, 2003 (DE) ................................ 103 10 662

(51) Int. Cl.
*F16K 11/00* (2006.01)
(52) U.S. Cl. ............... 137/311; 137/625.41; 137/625.46
(58) Field of Classification Search ................ 137/311, 137/625.41, 625.46
See application file for complete search history.

(56) References Cited

U.S. PATENT DOCUMENTS

| 2,079,743 A | 5/1937 | Krieger |
| 2,677,391 A | 5/1954 | Chellberg |
| 2,797,707 A | 7/1957 | Hursh |
| 3,752,167 A | 8/1973 | Makabe |
| 4,705,627 A | 11/1987 | Miwa et al. |
| 5,306,428 A | 4/1994 | Tonner |
| 6,135,152 A * | 10/2000 | Knapp .................... 137/625.41 |
| 6,959,731 B1 * | 11/2005 | Bartkus et al. ........ 137/625.46 |

FOREIGN PATENT DOCUMENTS

| DE | 8 32 819 B | 2/1952 |
| DE | 2118710 | 11/1972 |
| GB | 761690 A | 11/1956 |

OTHER PUBLICATIONS

International Search Report dated Jun. 1, 2004 (Three (3) Pages).
German Search Report dated Nov. 25, 2003 with English Translation of Relevant Pages (Four (4) Pages).

* cited by examiner

Primary Examiner—Kevin Lee
(74) Attorney, Agent, or Firm—Crowell & Moring LLP

(57) ABSTRACT

A valve for switching fluid paths, particularly for pressure exchanger installations with tubular chambers through which fluid flows in an alternating manner, including a rotatable closing element (12, 13) provided with a motorized drive shaft (14) and arranged inside a housing (2) having a plurality of connections (3, 4) for connecting lines leading to a pipe system and to a respective end of at least one pressure exchanger. Another end of each pressure exchanger is connected through a valve arrangement to a second pipe system. A splitter (7) provided with a plurality of overflow paths (17, 18, 27) is arranged inside the housing (2); mouths of the overflow paths are located on two axial end faces (10, 11) and on the circumference of the splitter (7), and a rotatable, disk-shaped control element (12, 13) is arranged in a sealing manner at each end face of the splitter (7).

29 Claims, 4 Drawing Sheets

FLOW-REVERSING VALVE

CROSS REFERENCE TO RELATED APPLICATIONS

This application is a continuation of international patent application no. PCT/EP2004/000987, filed Feb. 4, 2004 designating the United States of America and published in German as WO 2004/081431 on Sep. 23, 2004, the entire disclosure of which is incorporated herein by reference. Priority is claimed based on Federal Republic of Germany patent application no. DE 103 10 662.6, filed Mar. 12, 2003.

BACKGROUND OF THE INVENTION

The present invention relates to a valve, particularly for pressure exchanger installations comprising pressure exchangers with tubular chambers through which an alternating flow takes place, a rotatable closing element arranged inside a housing, the housing having a plurality of connections for connecting lines, the housing being connected to a first pipe system and in each case one end of at least one pressure exchanger, a respective other end of each pressure exchanger being connected through a valve to a second pipe system, and the closing element being provided with a motor-operated drive shaft.

In order to treat water, the reverse osmosis process is often used. In this process, a fluid stream to be purified is forced at high pressure through a membrane system which, in the case of large quantities of fluid, comprises a plurality of membrane modules. In such membrane modules, separation into pure water and an enriched concentrate is carried out through a membrane, since only some of a fluid to be purified can flow through a membrane. The proportion flowing through emerges as a usable proportion, as pure water or else permeate, on the other side of the membrane. The part which does not flow through leaves a membrane module as brine, a concentrate of the fluid enriched with salts and minerals, as a proportion which cannot be used and is under high pressure. This pressure is around 2 bar with a module inlet pressure of about 65 bar.

U.S. Pat. No. 5,306,428 discloses a reverse osmosis installation in which pressure exchangers in the form of tubular chambers are used to recover energy. By using these, the still high pressure of the high energy brine flowing out of the membrane module is transferred to a fluid still to be purified. Thus, a pump drive output which is lower by the amount of this pressure increase is required for the fluid to be introduced in order to generate the high pressure needed for the reverse osmosis process.

In order to control and/or switch the fluid paths of the brine into and out of the pressure exchangers, a Valve with a rotating closing element is used, in addition to other Valves. By using such a Valve, the tubular chambers of the pressure exchangers have brine emerging from the membrane modules applied to them alternately. The rotating closing element is constructed as a roll, in which connecting ducts are arranged in the manner of a three-way valve. During the changeover operations, all the flow paths are shut off completely. In order to avoid pressure surges during such changeover operations, pressure equalizing ducts are arranged within the roll.

Depending on the operating period of a membrane, its separation capability decreases and a fluid to be purified has to remain for a correspondingly longer time within a membrane module. For this reason, in the prior art, the changeover times of the roll are regulated using an actuating motor. However, this valve is suitable only for small reverse osmosis installations, since the flow cross sections within the valve are approximately the same size as the flow cross sections of the ducts to be filled. In large installations and the fluid columns to be displaced therein, and as a result of the forces necessitated thereby, a considerable problem of dimensioning the valve arises.

SUMMARY OF THE INVENTION

It is an object of the present invention to provide a changeover device, in particular for large reverse osmosis installations and the like, with which large flows of fluid can be distributed between different pressure exchangers in a straightforward and fault-free manner.

The solution to this program provides for a flow splitter provided with a plurality of transfer paths to be arranged within the housing, for openings of the transfer paths to be arranged at two axial ends and on the circumference of the flow splitter, and for a rotating, disk-like control element to be arranged in a sealing manner at each end of the flow splitter. Thus, in the case of such fluid flows which are to be controlled and which change direction periodically, a changeover with few pressure surges can be achieved.

Refinements of the invention provide for the end regions of the flow splitter inside the housing to be connected to the tubular chambers in which a pressure exchange is carried out with the aid of the changing fluid flows. In each case a connection for a supply of high pressure fluid and a discharge of low pressure fluid are arranged on the housing of the valve, in the circumferential region of the flow splitter and on the housing. What is known as brine under high pressure (HPB), for example, flows to the valve through the connection for a high pressure fluid. Following pressure transmission, the brine then flows in depressurized form, as what is known as low pressure brine (LPB) out of the housing through the discharge for low pressure fluid.

In the flow splitter there are arranged flow paths with the aid of which the flows having different pressures are distributed. In this case, within the flow splitter, two outer flow paths are connected to a high-pressure side and a central flow path, arranged between the former, is connected to a low pressure side. In order to ensure long-term operating reliability under the continuously changing pressure loadings, one or more reinforcing elements can additionally be arranged in one or more of the flow paths. This depends on the physical configuration of the flow splitter and the materials used.

The flow splitter can be an integral constituent part of the housing. It has been shown to be advantageous if the flow splitter is constructed as a housing insert. In this way, housing fabrication is simplified and the number of sealing points located on the housing can be reduced. It has likewise proven to be advantageous with regard to the closing behavior if the flow splitter is constructed as a ceramic or a ceramic-coated component.

The control elements are advantageously constructed in the form of a rotating rotary slide, which means that secure management of the sealing functions is possible, in addition to simple production. Therefore, a previously known closing element is replaced by control elements which act as temporary closing elements only during their rotational movement. The control elements alternately control the flow through the overflow paths of the flow splitter, which means that secure and efficient flow changeover is ensured. Furthermore, the control elements are provided with control openings located opposite one another in pairs, which means that a flow of a large amount is achieved in a small space.

Using an embodiment in which the control openings of a control element are arranged to be offset by at most 90° from one another in each case in relation to the control openings of the other control element, alternating changeover of the flow direction to the tubular chambers connected to the housing is carried out in an extremely simple way during a rotational movement of the control elements.

Since the control elements are subjected to alternating loading in operation, they are provided with reinforcements on the side facing away from the flow splitter. It is likewise possible. to provide the control elements with reinforcements on their circumference. These may be additional material masses, built-in components, supporting elements, tensioning elements and the like. This depends on the materials used.

In order to reduce the forces between flow splitter and control element, one or more depressions are arranged on the ends of the flow splitter in order to form narrow bearing surfaces. This measure avoids contact over the entire area, by which higher frictional forces are caused. Instead, the formation of narrow contact surfaces is thus possible, which also permit improved sealing at the same time.

In order to separate different pressure regions in the chambers located in the housing, seals bear on the control elements on the side facing away from the flow splitter. These can be of a sliding ring seal design. Apart from the ability to be produced easily, the advantage of the. known secure sealing action is therefore provided. In addition, the shaft is arranged in a region of the housing which is shielded by the seals and is connected to the low pressure side LPB. As a result, a passage of the shaft through the housing wall to the outside advantageously only has to be sealed by a conventional shaft seal designed for low pressure. This entails less effort than sealing off such a shaft passageway with respect to the high pressure side HPB. And, within the Valve, as a result no additional seals are required for the passage of a shaft.

Further refinements provide for a shaft driving the control elements to pass through the flow splitter and for the control elements to be connected in a force-transmitting manner to the shaft. This simplifies the mounting and the driving of the control elements. The control elements are constructed as ceramic or coated components, which provide high resistance to wear and attack by the fluid flows to be controlled.

Mounting and maintenance are made considerably easier if flow splitter, shaft and control elements are all constructed as a housing insert. Thus, serviceability can be ensured in an extremely short time. And, as a result of the arrangement of sealing zones arranged on the circumference of the flow splitter between inlet and outlet, overflow between these two zones is avoided.

In order to achieve a gentle changeover, the tubular chambers of the pressure converter are connected to one another briefly by the position and the size of the control openings during a movement of the rotary slide. The position and the size of the control openings on the control elements constructed as rotary slides permits a flow changeover which is free of pressure surges, since a simultaneous connection to a supply of high pressure fluid is thereby always ensured. Closing a control opening of a connected tubular chamber is at the same time connected with opening of another previously closed control opening of a further tubular chamber and vice versa. Because of the enlarged control openings and because of their position on the control element, an overlap with the flow openings arranged fixedly in the flow splitter is achieved. Such an overlap in this case has a beneficial effect on the changeover and the behavior of the flowing fluid columns affected thereby.

Depending on the flow rate of the pressure converter, the position of the control openings is changed at a continuous and/or discontinuous speed. The degree to which the tubular chambers are filled can therefore be influenced. The use of a discontinuous speed permits a longer residence time of the flow openings over the control openings, utilizing the full opening cross section. The discontinuous movement achieves greater channel filling in a shorter time and thus a maximum possible flow rate. This can be done with the aid of an appropriately designed drive motor. When a conventional rotary drive with continuous movement of the control elements is used, the same device can also be used for small installations, since a smaller flow rate is switched therewith. Conversely, with a discontinuous movement of the control elements, at a given flow rate the overall volume of the device can be reduced. With the aid of adjustable switching times of the control elements, the volume throughput can be influenced as a function of the pressure differences present.

BRIEF DESCRIPTION OF THE DRAWINGS

The invention will be described in further detail hereinafter with reference to illustrative preferred embodiments shown in the accompanying drawing figures, in which:

FIG. 4b is a perspective view of the flow splitter in the assembly with the two control elements in a second operating state, the control elements being illustrated rotated through 90° in each case with respect to FIG. 4a.

DETAILED DESCRIPTION OF PREFERRED EMBODIMENTS

Figure 1A:
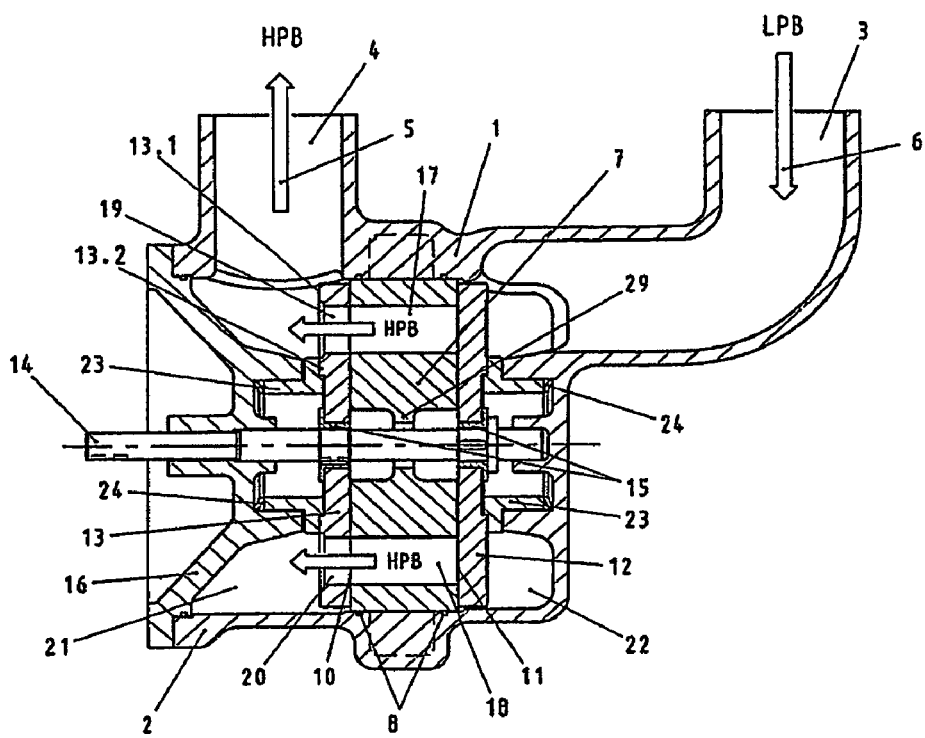
FIGS. 1a and 1b are sectional views of the Valve, offset through 90°, in a first operating state, in each case in the plane of the inlets and outlets.

A Valve 1 is shown in section in FIG. 1a. The housing 2 has two connections 3, 4 through which a connection to the tube chambers (not shown) of a pressure exchanger system is made. An alternating exchange of a fluid which flows in under high pressure and flows back at lower pressure is effected via the connections 3, 4. Arrows 5, 6 show the respectively prevailing flow directions. The distance between the connections 3, 4 is chosen in accordance with the distance between tubular chambers to be connected thereto. This integration of the connections 3, 4 into the housing 2 avoids unnecessary additional sealing points.

Arranged inside the housing 2 is a flow splitter 7 which, in the illustrative embodiment shown, is configured as a separate insert. It can equally well be configured as a single-piece component with the housing 2. The flow splitter 7, formed as an insert here, is sealed off with respect to the housing 2 with the aid of seals 8. In the region of the circumference of the flow splitter 7 there is arranged a chamber 9, which is used to discharge a depressurized fluid. In each case a control element 12, 13 bears in a sealing manner on the ends 10, 11 and is set rotating with the aid of a shaft 14 driven by a motor, not illustrated. The force is transmitted between shaft 14 and the control elements 12, 13 by means of bearing elements 15. These can be configured as polygons or force-Valve and form-Valve in another way. The shaft 14 is mounted in the interior of the housing 2 at one end and, on the opposite side, is mounted and sealed off in a cover 16 which closes the housing 2.

The rotating control elements 12, 13, which are configured in the manner of rotary slides here, have reinforcements 12.1 to 13.2. These reinforcements improve the alternating bending loading of the control elements 12, 13 during the changeover operation. Depending on the materials used, that is to say metal or ceramic or combinations thereof, these reinforcements can be formed as accumulations of material, plates, rings, struts or the like.

In the illustration of FIG. 1, a fluid under high pressure, for example a high pressure brine (HPB), flows from two T-shaped flow paths 17, 18 through control openings 19, 20 arranged opposite one another in pairs and belonging to the control element 13 into an end region 21 of the housing 2 and from there, via the connection 4, to a tubular chamber. At the same instant, a fluid under a low pressure, for example a low pressure brine LPB, flows through the connection 3 from a tubular chamber into the end region 22 of the housing 2.

Seals 23 bearing on each control element 12, 13 prevent fluid exchange with other housing regions. The seals 23 are constructed in the manner of a sliding ring seal, held in the housing 2 so as to be secured against rotation, and bear in a sealing manner on the control elements 12, 13 under the pressure of springs 24.

Figure 1B:
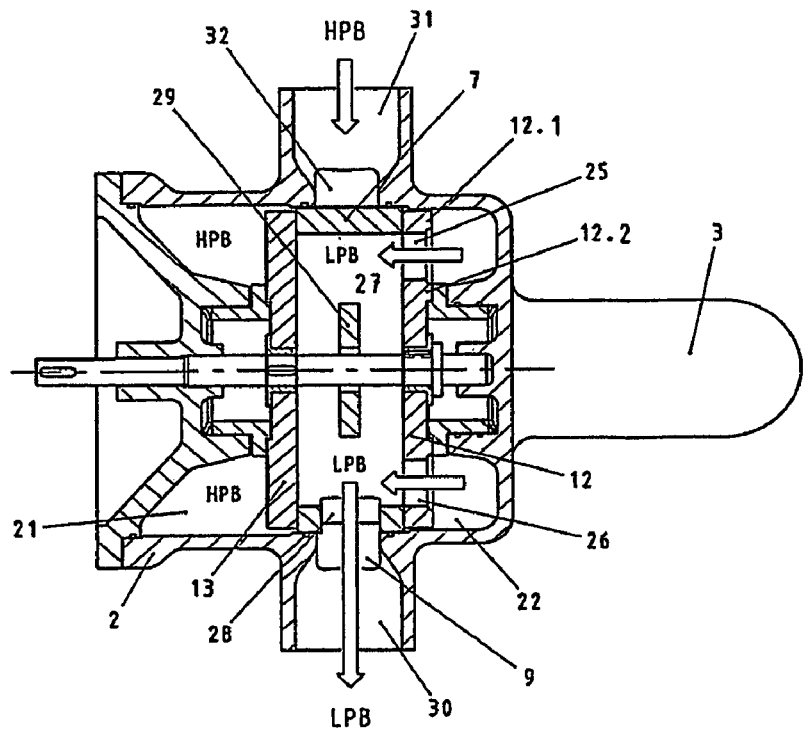

FIG. 1b corresponds to the illustrative embodiment of FIG. 1a in terms of the instantaneous position of the control elements in relation to the flow splitter. However, a section rotated through 90° is shown in FIG. 1b. It reveals that, of the control element 12, the control openings 25, 26 arranged in pairs are connected in a fluid-carrying manner to a flow path 27 which is arranged in the center of the flow splitter 7. The central flow path 27, designed for an outward flow of a low pressure fluid (LPB) is arranged between the two flow paths 17, 18 designed for a high pressure fluid (HPB). In order to manage the alternatingly occurring forces securely, a reinforcing element 29 of a transverse rib type is arranged in the flow path 27. This ensures a beneficial flow of force within the flow splitter 7.

A low pressure fluid supplied through the connection 3 into the housing 2 flows via the control opening 25, 26 into the flow path 27 and from there flows out of the housing as low pressure fluid via an opening 28 in the flow splitter 7 and an outlet 30. Arranged opposite the outlet 30 on the housing 2 is a connection 31 for the supply of high-pressure fluid HPB to the housing 2. With the aid of the chamber 32 arranged on the circumference of the flow splitter 7, the high pressure fluid is conducted to the two T-shaped flow paths 17 and 18. With the aid of the low pressure chamber 9 arranged opposite, the low pressure fluid is discharged from the housing 2 via the outlet 30.

Figure 2A:
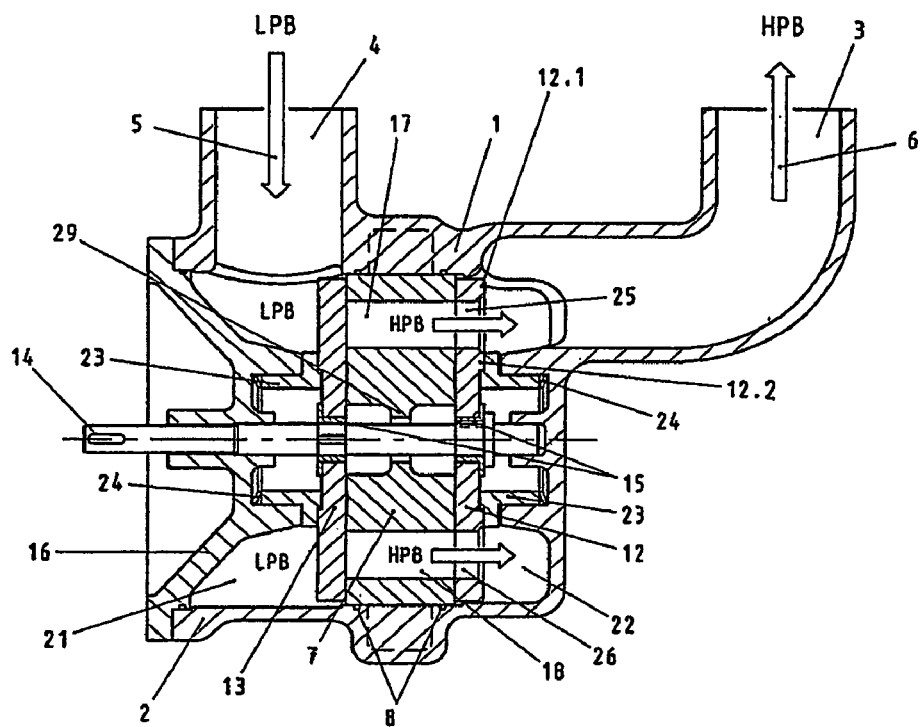
FIGS. 2a and 2b are sectional views of the Valve, offset through 90°, in a second operating state, the control elements in each case being illustrated rotated through 90° with respect to FIGS. 1a and 1b.
Figure 2B:
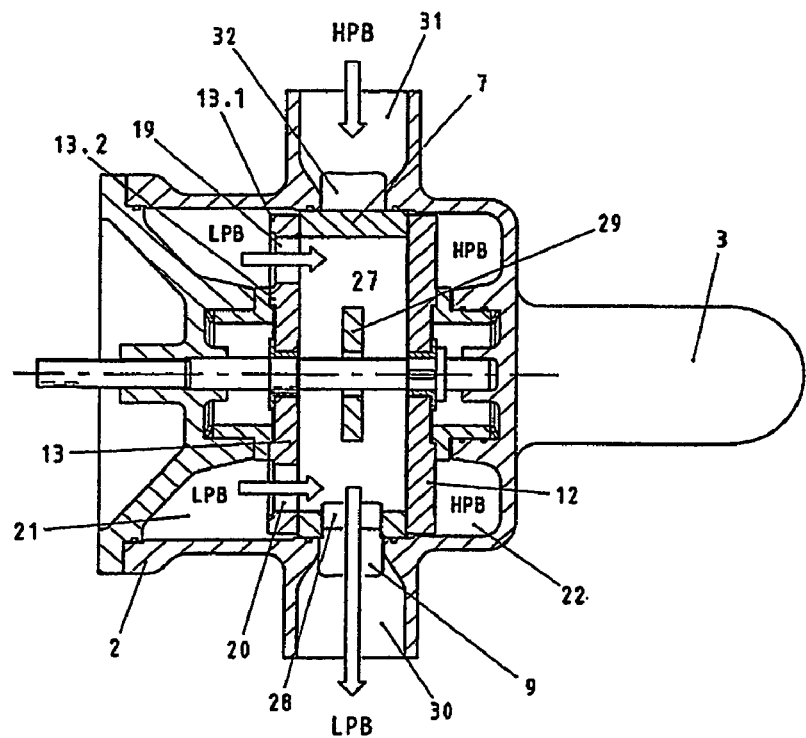

FIGS. 2a and 2b show the same sections through the Valve as FIGS. 1a and 1b, but in a second operating state. In this case, the control elements 12 and 13 have been rotated onward through 90° in each case via the shaft 14 and the bearing elements 15. The fluid (HPB) flowing into the flow paths 17, 18 through the high pressure connection 31 and the chamber 32 is now deflected via the control openings 25, 26 into the chamber 22, from where it passes via the connection 3 to a tubular chamber (not shown). At the same time, low pressure fluid (LPB) flows via the connection 4 from a second tubular chamber into the chamber 21, through the control openings 19, 20 into the central flow path 27 in the flow splitter 7 and from there out of the Valve via the opening 28, the chamber 9 and the connection 30. By further rotation of the parts 12, 13, 14 and 15 through 90°, the first operating state, illustrated in FIGS. 1a and 1b, is then reached again.

Figure 3A:
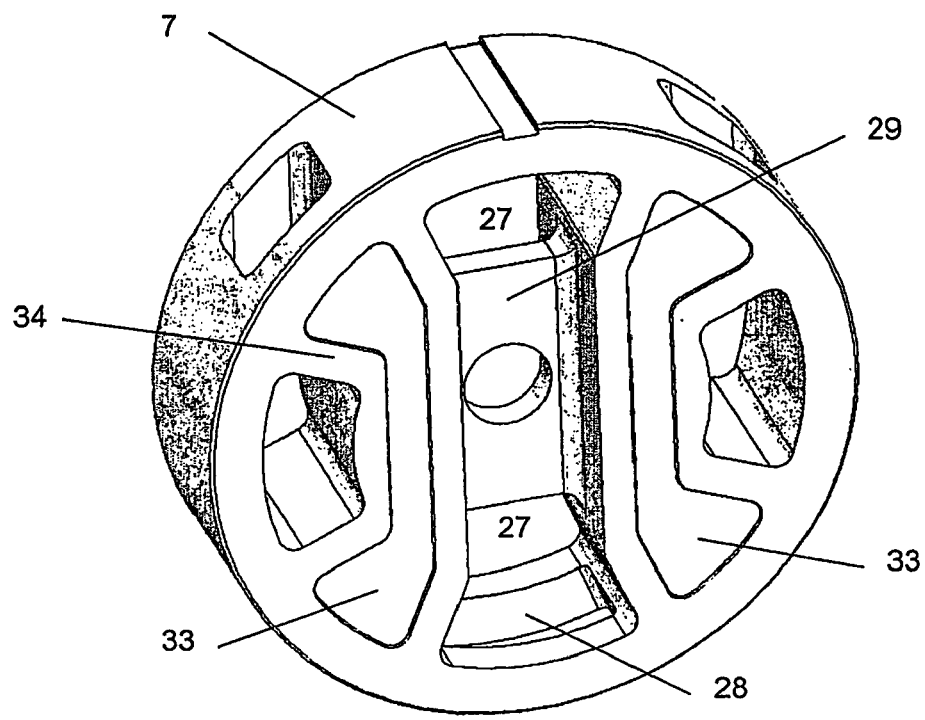
FIG. 3a is a perspective view of the flow splitter.
Figure 3B:
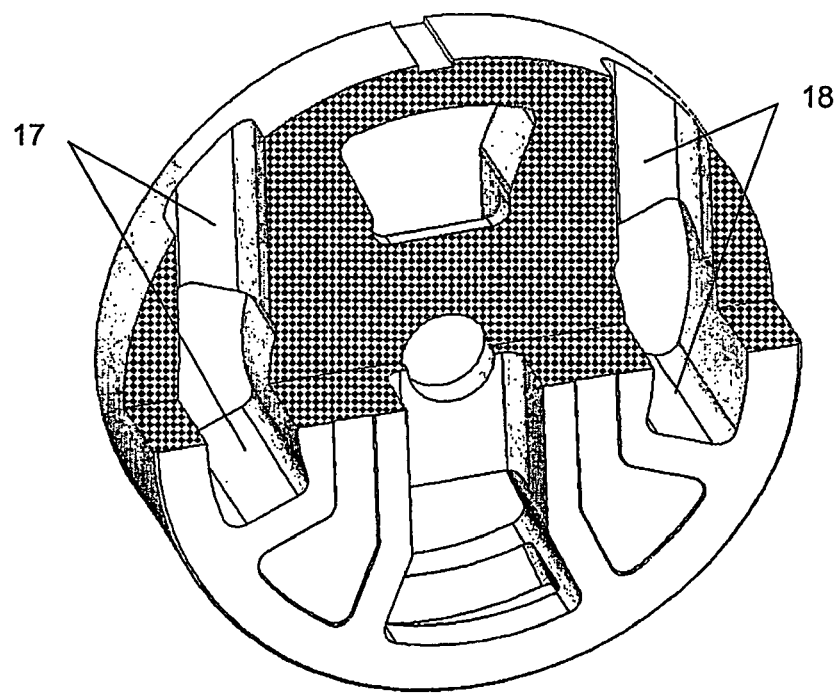
FIG. 3b is a perspective view of the flow splitter in which one quarter of the flow splitter has been cut away in order to make the flow paths visible.

FIG. 3a shows a perspective view of the flow splitter 7 with a central flow path 27, and FIG. 3b shows, by means of a partial section in the flow splitter 7, the position of the outer flow paths 17 and 18 still located therein. In the central flow path 27 there is a reinforcing element 29, in which there is an opening for the shaft 14 to extend through. Furthermore, a plurality of depressions 33 are made in the end 11 of the flow splitter 7, which means that narrow bearing surfaces 34 are formed on the end face 11. This reduces the frictional forces between the parts sliding on one another and at the same time improves the sealing action. The T-shaped course of the flow paths 17, 18 ensures in the simplest way that an alternating outflow of a high pressure fluid into the respectively connected tubular chamber becomes possible as a result of the control openings 19, 20; 25, 26 sliding alternately past. A fluid flows out of the central flow path 27 to the outside via an opening 28 and via the outlet 30 from the housing 2.

Figure 4A:
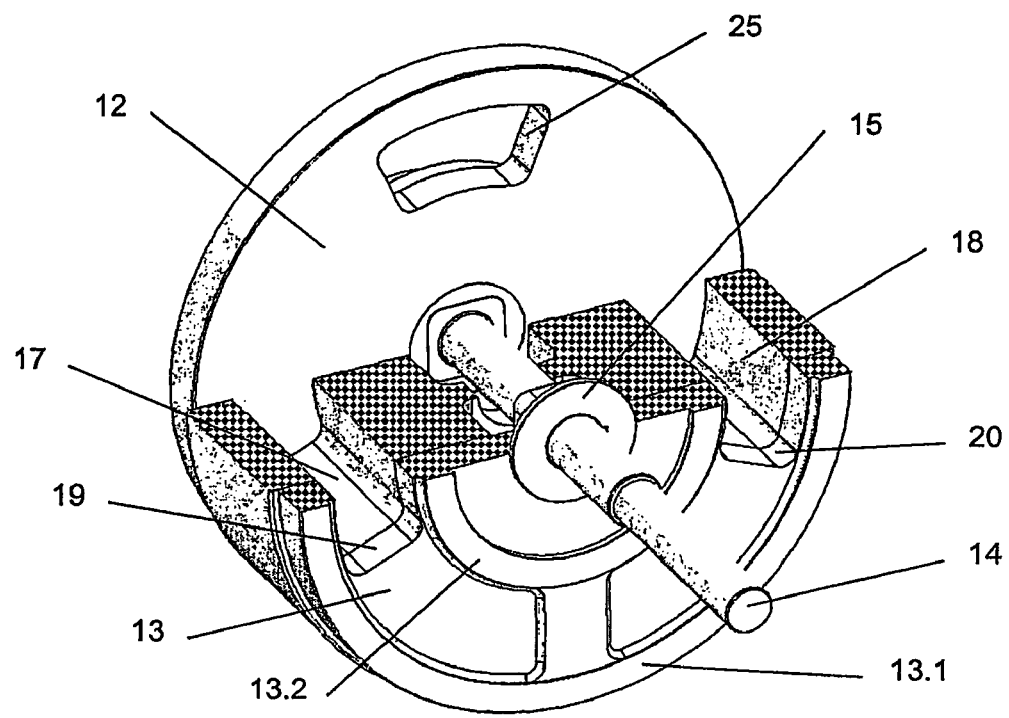
FIG. 4a is a perspective view of the flow splitter in the assembly with the two control elements in a first operating state, with the upper part having been cut away in order to clarify the flow direction.
Figure 4B:
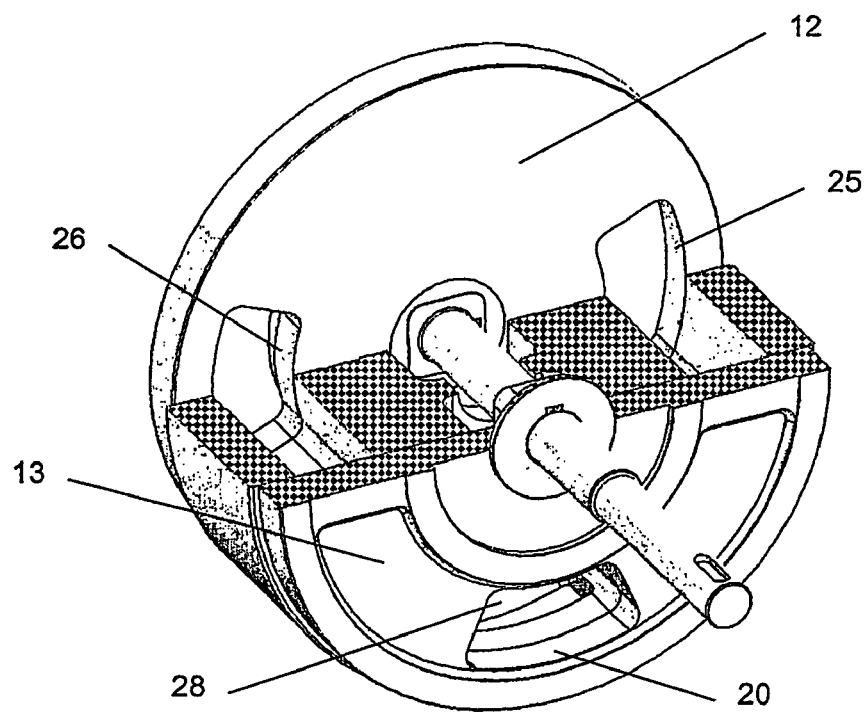

FIGS. 4a and 4b show a perspective arrangement of the functional parts in the form of the flow splitter 7, the control elements 12, 13, the shaft, 14 and the bearing elements 15 of the Valve 1, in each case in partial section. Here, FIG. 4a shows the first operating state and FIG. 4b the second operating state with the parts 12, 13, 14 and 15 rotated through 90° in each case with respect to the flow splitter 7. In FIG. 4a it becomes clear how, in a first operating state, the high pressure fluid HPB flows through the flow paths 17, 18 and the control openings 19, 20 to the side at the front in this view. At the same time, on the other side or, here, the rear side, the path via the central flow path 27 to the opening 28 is free via the flow openings 25, 26 arranged in pairs, the latter being hidden.

In the second operating state, shown in FIG. 4b, the relationships in the converse state are illustrated. For this purpose, the control elements 12, 13 are shown as having been rotated through 90° with respect to the flow splitter 7 with the aid of the shaft 14 and the bearing elements 15. In this view of the drawing, a high pressure fluid (HPB) flows rearward via the flow openings 25, 26 of the control element 12. At the same time, via the flow openings 19, 20 likewise arranged in pairs (19 has been cut away by the partial sectional illustration), a depressurized low pressure fluid LPB passes from the front side of the view of the drawing into the central flow path 27 and flows out of the Valve from there via the opening 28.

By means of this solution having the control elements 12, 13 arranged on both sides of a flow splitter 7, an extremely compact changeover Valve with high operational reliability is provided. At the same time, the number of sealing points and pipeline connections needed for such a Valve could be reduced to a minimum.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A valve for changing fluid paths in pressure exchanger installations comprising pressure exchangers with tubular chambers through which an alternating flow takes place, a rotatable closing and distributing element arranged inside a housing, said housing having a plurality of connections for connecting lines of pipe systems, said closing and distributing element having a motor-operated drive shaft, wherein a flow splitter provided with a plurality of transfer paths is arranged within the housing, and openings of the transfer paths are arranged at two axial ends and on the circumference of the flow splitter, and a rotatable, disk-like control element is arranged in a sealing manner at each end of the flow splitter as a closing element.

2. A valve according to claim 1, wherein the end regions of the flow splitter are connected to the tubular chambers of the pressure exchanger.

3. A valve according to claim 1, wherein a connection for supplying a high pressure fluid and a connection for discharge of low pressure fluid are arranged on the housing in the circumferential region of the flow splitter.

4. A valve according to claim 1, wherein at least three flow paths are arranged in the flow splitter.

5. A valve according to claim 4, wherein said flow paths comprise at least two outer flow paths which are connected to a high pressure side, and at least one central flow path arranged between said outer flow paths which is connected to a low pressure side.

6. A valve according to claim 4, wherein at least one reinforcing element is arranged in at least one of the flow paths.

7. A valve according to claim 5, wherein the outer flow paths have a T-shaped course.

8. A valve according to claim 1, wherein the flow splitter is constructed as a housing insert.

9. A valve according to claim 8, wherein the flow splitter is constructed as an exchangeable insert arranged in a sealing manner.

10. A valve according to claim 1, wherein the flow splitter is constructed as a ceramic component or as a ceramic-coated component.

11. A valve according to claim 1, wherein the control elements are constructed as rotary slides.

12. A valve according to claim 1, wherein the control elements are provided with control openings arranged in pairs opposite one another.

13. A valve according to claim 12, wherein the control openings of one control element are arranged offset from the respective control openings of the other control element by at most 90°.

14. A valve according to claim 11, wherein the control elements are provided with reinforcements on the side facing away from the flow splitter.

15. A valve according to claim 11, wherein the control elements are provided with reinforcements on the circumference thereof.

16. A valve according to claim 1, wherein at least one depression is arranged on each end of the flow splitter in order to form narrow bearing surfaces.

17. A valve according to claim 1, wherein the control elements are disposed in contact with seals on the side facing away from the flow splitter.

18. A valve according to claim 17, wherein said seals are sliding ring seals.

19. A valve according to claim 17, wherein the drive shaft is arranged in a region of the housing which is shielded by the seals and which is connected to the low pressure side.

20. A valve according to claim 17, wherein the seals bear against the control elements in a sealing manner under the pressure of springs.

21. A valve according to claim 1, wherein the drive shaft which drives the control elements extends through the flow splitter.

22. A valve according to claim 1, wherein the control elements are connected to the drive shaft in a force transmitting manner.

23. A valve according to claim 1, wherein the control elements are constructed as ceramic components or as ceramic-coated components.

24. A valve according to claim 1, wherein the flow splitter, the drive shaft, and the control elements are constructed as a housing insert.

25. A valve according to claim 3, wherein sealing zones are arranged on the circumference of the flow splitter between the supply and discharge connections.

26. A valve according to claim 1, wherein due to the position and the size of the control openings, the tubular chambers of the pressure converter are connected to one another briefly via the flow splitter when the control element is moved.

27. A valve according to claim 26, wherein the control openings have a position and a size which enable a flow changeover which is free of pressure surges.

28. A valve according to claim 26, wherein when the control openings of one tubular chamber are closed, previously closed control openings of another tubular chamber are simultaneously opened, and when the control openings of said one tubular chamber are opened, the previously open control openings of said another tubular chamber are simultaneously closed.

29. A valve according to claim 1, wherein the position of the control openings is changed at a continuous or discontinuous rate depending on the flow rate through the pressure exchanger.

* * * * *